United States Patent [19]

Wemhoff

[11] Patent Number: 4,640,769
[45] Date of Patent: Feb. 3, 1987

[54] APPARATUS FOR PHOTOGRAPHIC FILM PROCESSOR POLLUTION CONTROL

[76] Inventor: Mark F. Wemhoff, P.O. Box 4031, Enterprise, Fla. 32725

[21] Appl. No.: 770,609

[22] Filed: Aug. 29, 1985

[51] Int. Cl.[4] .......... B01D 1/02; B01D 5/00; C02F 1/04; C02F 1/32
[52] U.S. Cl. .................. 210/96.1; 210/180; 210/181; 210/192; 202/182; 202/202; 203/31; 203/41
[58] Field of Search ............ 210/748, 180, 175, 181, 210/192, 266, 664, 668, 96.1, 760; 203/31, 41; 202/182, 202; 75/118 P, 83

[56] References Cited

U.S. PATENT DOCUMENTS

| | | | |
|---|---|---|---|
| 4,219,415 | 8/1980 | Nassef et al. | 210/184 |
| 4,332,687 | 6/1982 | Daignault et al. | 75/118 P |
| 4,337,119 | 6/1982 | Donahue | 210/180 |
| 4,456,512 | 6/1984 | Bieler et al. | 210/748 |

Primary Examiner—Benoit Castel
Attorney, Agent, or Firm—Robert M. Skolnik

[57] ABSTRACT

The apparatus uses a combination of technologies for treatment of hazardous and nonhazardous liquid wastes. The first treatment step is an evaporation stage where the liquid wastes are heated. The resulting steam and vapors are then oxidized by photolysis and photolytic catalyzed ozone before they are condensed. The steam and vapors are then condensed and the condensate is passed through a column of activated carbon. The activated carbon absorbs any unoxidized Chemical Oxygen Demanding (COD) species and aids in the control of any odors which may be emitted in the evaporation stage.

7 Claims, 1 Drawing Figure

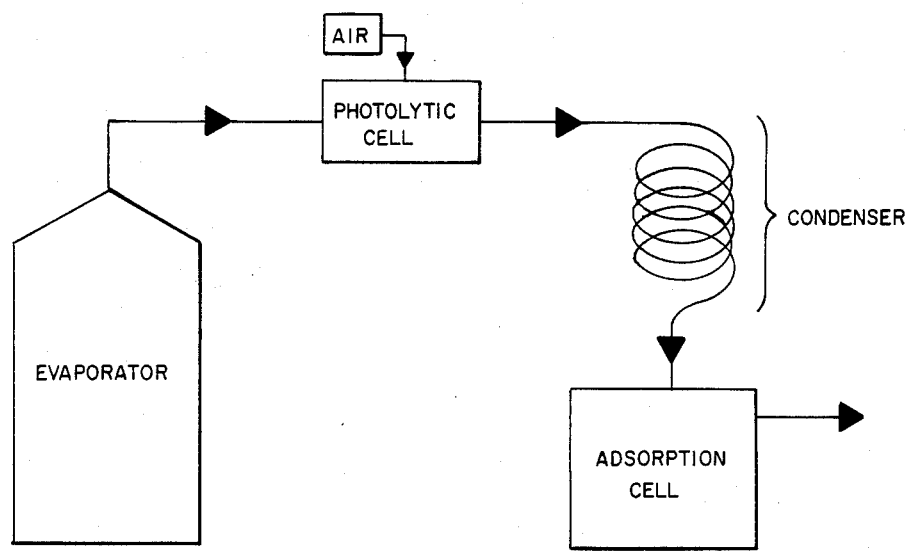

APPARATUS FOR PHOTOGRAPHIC FILM PROCESSOR POLLUTION CONTROL

FIELD OF INVENTION

This invention relates to pollution abatement in the removal of metals and reduction of biological and chemical oxygen demand (BOD/COD), to resource recovery in the recovery of metals, and specifically, to such removal, reduction, and recovery in the effluent of washless photographic processing, by means of combined evaporation, photolysis, photo-oxidation, and activated carbon adsorption.

DISCUSSION OF PRIOR ART

Heretofore, evaporation, photolysis, photo-oxidation, and activated carbon adsorption have each been employed as unit operations in pollution abatement and resource recovery.

However, no combination of unit operations had heretofore been developed, which was capable of providing suitable pollution abatement and resource recovery in the effluent of washless-type photographic processing chemistry. This effluent typically consists of spent processing chemicals and rinse waters which contain certain metals and volatile organic compounds, the discharge of which is unlawful under Title 33, Section 1311, paragraph A of the United States Code, and other Federal, state, and local environmental regulations.

Methods now in use recover metals from conventional photographic processing effluent by metallic replacement, reverse osmosis, ion exchange, chemical precipitation, electrowinning, evaporation, and other techniques. However, these methods are also not capable of reducing the biological and chemical oxygen demand (BOD/COD) caused by certain volatile organic compounds which are present in several new types of processing chemistry.

In addition, the aforesaid new types of chemistry have been developed for automated processing equipment which is intended for use in small, "one-hour" photo-processing outlets, which are typically located in areas of concentrated retail business activity, and operated by proprietors with limited capital resources.

For these reasons, legal limitations on the discharge of volatile organic compounds are strictly enforced, and waste generators are often unable to afford the elaborate and expensive apparatus required to reduce there pollutants.

As a result, many proprietors are unable to obtain permits to discharge their wastes into sewers and/or publicly owned treatment works.

Further disadvantages, particular to each field, industry, process, or type of effluent to which pollution abatement and resource recovery by the combination of evaporation, photolysis, photo-oxidation, and activated carbon adsorption might apply, also render the methods now in use impractical, for reasons which relate to the primary disadvantages outlined above.

Accordingly, several objects of my invention are as follows:

Effective metals removal—The invention removes heavy metals to levels which enable the waste generator to discharge process effluent in compliance with environmental regulations.

Effective metals recovery—The invention recovers metals at an efficiency and in such form as to render them economically beneficial to the waste generator.

Reduction of volatile organic compounds—The invention reduces volatile organic compounds in the effluent to levels which enable the waste generator to discharge process effluent in compliance with environmental regulations.

Compact size—The dimensions of the invention are uniquely suitable for operations which generate washless-type photographic processing effluent.

Skill requirement—The simplicity and semi-automatic operation of the invention are uniquely suitable for operations which generate washless-type photographic processing effluent.

Further objects and advantages—Further objects and advantages will become apparent from consideration of the drawings and ensuing description thereof.

DRAWINGS

The FIGURE is a schematic diagram of the system for removal of metals and reduction of biological and chemical oxygen demand (BOD/COD) in accordance with the present invention.

DESCRIPTION

The system of the present invention for the removal of metals and reduction of biological and chemical oxygen demand (BOD/COD) in washless photographic processing chemistry by evaporation, photolysis, photo-oxidation, and activated carbon adsorption includes a plurality of components, including an insulated enclosure, and evaporator, a photolytic cell, a condenser coil, an activated carbon adsorption cell, and a control means.

The present invention will be more fully understood by reference to the FIGURE which schematically discloses the system for evaporation, photolysis, photo-oxidation, and activated carbon adsorption.

The unit operations required by my invention are described in detail in articles contained in *UNIT OPERATION FOR TREATMENT OF HAZARDOUS INDUSTRIAL WASTE*, 1978, Noyes Data Corporation, Park Ridge, N.J., Prepared for Publication by D. J. De Renzo, containing sections on *EVAPORATION*, by Lawrence R. Woodland, pages 445-474; *OZONATION*, by Judith C. Harris, pages 767-797; and *PHOTOLYSIS*, by Judith C. Harris, pages 798-809. The combination of ozone and ultraviolet radiation is described in Prengle, et al., *OXIDATION OF REFRACTORY MATERIALS BY OZONE WITH ULTRAVIOLET RADIATION*, Second Annual Symposium on Ozone Technology, Montreal Canada, May 11-14, 1975.

The system includes an evaporator, consisting of a vessel which is heated by electrical resistance. Processing effluent is introduced to the vessel, and heated under a partial vacuum, causing water and volatile organic compounds to be expressed as vapor. Solids and complexed ionic metals remain in the vessel, contained in a temperature-resistant liner, which can be removed for disposal when a sufficient quantity of solids have accumulated.

From the evaporator, vapor passes into a cell in which short-wave ultraviolet radiation produces a photolytic reaction, reducing the volatile organic compounds and other sources of biological/chemical oxygen demand (BOD/COD). Compressed air is also introduced at the photolytic cell, in order to stimulate the production of ozone, which further enhances the reduction of BOD/COD.

From the photolytic cell, vapor passes into a condenser which further enhances the reduction of BOD/COD, and causes the improved effluent to return to a liquid state. Preferably, the photolytic cell includes a short-wave ultraviolet radiation source, a source of positive air pressure, and an accumulator pad fabricated of spun strands of corrosion-resistant metal.

From the condenser, condensate passes into an activated carbon adsorption cell, which further enhances the reduction of BOD/COD. The activated carbon adsorption cell also incorporates an aeration device, which extends the useful life of the activated carbon media. Preferably, the activated carbon adsorption cell consists of a matrix of baffles which cause liquid to be forced along an extended path through the activated carbon media, and an aeration device for extending the life of the activated carbon media.

From the activated carbon adsorption cell, filtered effluent exits the system.

The system of the present invention includes a control means which is responsive to the progress and completion of each sequential batch of processed effluent. Once the operator supplies a batch of effluent for processing and activates the system, processing is automatic, and the system will shut down at completion.

Integral to the functioning of the system is the insulated enclosure, which conserves heat in that portion of the system occupied by the evaporator, and facilitates cooling in that portion occupied by the photolytic cell and condenser. Access to the enclosure permits removal of accumulated solids from the evaporator, and maintenance of the activated carbon adsorption cell.

While a particular embodiment of the present invention has been shown and described, it will, however, be recognized that other embodiments may occur to those skilled in the art, and these embodiments are included within the spirit and scope of the appended claims.

What is claimed is:

1. A system for the removal of metals and reduction of biological and chemical oxygen demand (BOD/COD) in washless photographic processing chemistry comprising:

an evaporator including means for receiving effluent from said photographic processing, the effluent having metals dissolved therein and containing certain volatile organic compounds and other substances characterized by BOD/COD; said evaporator including a corrosion-resistant vessel and having a temperature-resistant removable liner affixed to the interior of said vessel for collecting solids, a heat source for separation of vaporized water and volatile organic compounds from solids and complexed ionic metals;

a photolytic cell and ozone generator fluidly coupled to said evaporator for receiving, oxidizing, and photolyzing the vaporized water and volatile organic compounds;

a condenser fluidly coupled to said photolytic cell and ozone generator for receiving and condensing said photolyzed vapor into a condensate;

an activated carbon adsorption cell fluidly coupled to said condenser for receiving and purifying said condensate, said adsorption cell comprising an activated carbon media and outlet means;

an insulated enclosure for said system for conserving evaporative heat and dissipating condenser heat; and control means coupled to said evaporator, photolytic cell and ozone generator, condenser, and activated carbon adsorption cell for controlling the operation of the system.

2. The system of claim 1, wherein the photolytic cell consists of a short-wave ultraviolet radiation source; a positive air pressure source; and an accumulator pad fabricated of spun strands of corrosion-resistant metal.

3. The system of claim 1, wherein said condenser consists of a finned coil cooled by air.

4. The system of claim 3, wherein said oxidizer uses chemical means of oxidation.

5. The system of claim 1, wherein said condenser consists of a finned coil cooled by water.

6. The system of claim 1, wherein the activated carbon adsorption cell consists of a matrix of baffles, causing liquid to be forced along an extended path through the activated carbon media.

7. The system of claim 6, wherein said activated carbon adsorption cell contains an aeration device which extends the useful life of the activated carbon media.

* * * * *